Feb. 14, 1933.  A. OSWALD  1,897,274
MACHINE FOR REPRODUCING CINEMATOGRAPHIC FILMS
Filed Feb. 7, 1928
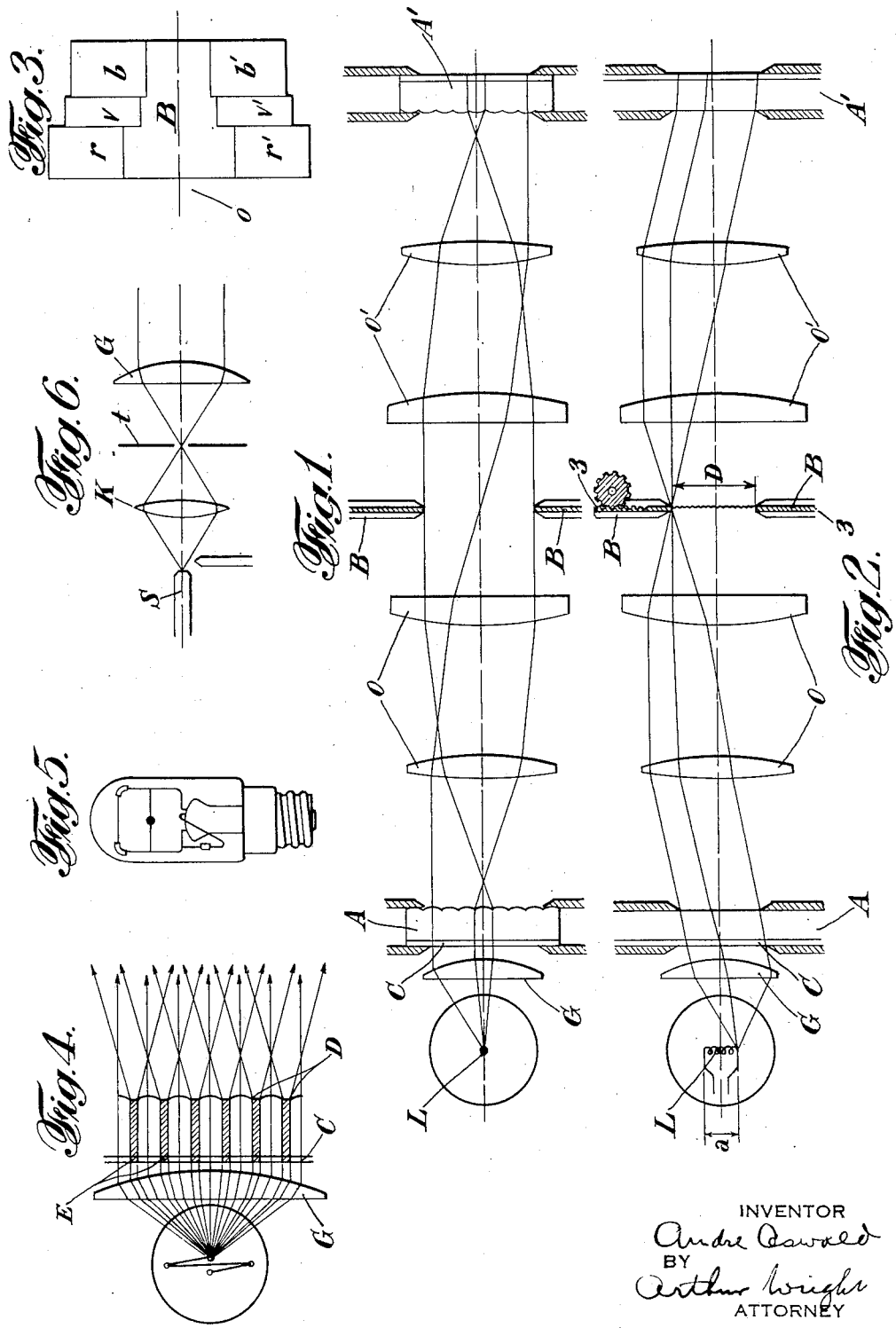
INVENTOR
André Oswald
BY
Arthur Wright
ATTORNEY Patented Feb. 14, 1933

1,897,274

UNITED STATES PATENT OFFICE

ANDRÉ OSWALD, OF PARIS, FRANCE, ASSIGNOR TO KELLER DORIAN COLORFILM CORPORATION OF AMERICA, OF NEW YORK, N. Y., A CORPORATION

MACHINE FOR REPRODUCING CINEMATOGRAPHIC FILMS

Application filed February 7, 1928, Serial No. 252,648, and in France February 7, 1927.

My invention relates to optical devices for intensifying the colors and changing the shades thereof at will in the reproduction of Keller-Dorian embossed films made with the Keller-Dorian drawer described in my co-pending application Serial No. 17,724, filed March 23, 1925, and my French Patent No. 573,399 of January 29, 1923, respectively.

It will be remembered that the Keller-Dorian films are those whose surface of celluloid is embossed with very small lenticular particles acting either as spherical diopters (picots) or as cylindrical diopters (lined film).

In the drawing I have shown different embodiments of my invention, in which—

Fig. 1 illustrates a reproduction by means of a luminous point as a source of light;

Fig. 2 is a similar view using a rectilinear filament as a source of light;

Fig. 3 is a diagrammatic view showing a shutter arrangement, illustrated in section in Fig. 2, whereby the amounts of light are varied in the color filter;

Fig. 4 is a plan view showing a source of light in the form of a luminous point;

Fig. 5 is an elevation of a lamp used for this purpose; and

Fig. 6 is a view showing a Philips tungsten arc lamp as a source of light.

In the said figure the film A to be reproduced and the virgin film A' are placed in the two anti-principal planes of the reproducing objective with the embossing on the side toward the objective. The reproducing object is an objective formed of two parts O—O' symmetrical, calculated and established in such wise that the images C, of the selector filter of colors, fixed on the surface of gelatine of the films to be reproduced, are reestablished in the plane of diaphragm B of the said reproducing objective, by the picot arrangement; the first half O of this objective.

The image of said diaphragm B is engaged by the other half O' of the objective and by the picots or lines of the virgin film A' and is formed anew on the sensitive layer opposite each picot.

Now the picots and lines are not diopters perfectly. As in the case of all diopters, they are affected by all aberrations. Furthermore the embossing often gives rounded edges, a fault which is called "tables". These "tables" diffuse the light and cause the colors to be washed with white during reproduction.

In order to increase the output of the colors, according to the principal characteristic of my invention, the film to be reproduced is illuminated by the light which is strictly parallel. In fact, if it is assumed that the picots or lines are diopters further open than the objective engaging the views, there remain the spaces between the picots or lines not exposed to the light and which are blackened upon inversion. These are known as horns. Now these horns happen to be opposite the tables and obstruct them completely when illumining with parallel light (Fig. 3).

In the case of the reproduction of picot films illumination must take place by a light which is strictly parallel in all directions. For this purpose, in the focus of a lens or achromatic objective is placed a luminous point as at L, Figs. 1, 4 and 5 which can be for example a hole pierced in a sheet of foil as in Fig. 1 and strongly illuminated or better still a Philips tungsten arc lamp which is a luminous source which is rigorously punctiform as at S, Fig. 6.

For reproducing lined films, illumination is produced either by a luminous slot, or by a lamp L of Fig. 2 having a rectilinear filament placed in the focus of the collimator lens G and parallel to the lines (Fig. 2).

If:

$a$ = length of the filament;
$f$ = focal length of the lighting collimator lens G;
$F$ = focal length of ½ the reproducing objective O—O'; and
$D$ = diameter of diaphragm B
then, $$\frac{f}{F} = \frac{a}{D}$$

If, for artistic reasons or the like, it is judged necessary to change or modify the colors of the film, it may be easily arrived at irrespective of what change is desired by the means about to be described. The image of the selector filter for colors is formed in the plane of the diaphragm (Fig. 1). If screens or regulatable slots are slid into the diaphragm of the reproducing objective, Figs. 2 and 3, the part of the diaphragm corresponding to any particular color may be weakened or strengthened. The corresponding color in the film to be reproduced disappears whereas the two others are improved and become more strong. Furthermore it is almost always necessary to close the central part of the objective (corresponding to green) because the spectrums of diffraction of the filament which form on the diaphragm are much weaker for the higher orders (red or blue part of the diaphragm) than for the central image of the filament.

Having thus described my invention what I claim as new and desire to secure by Letters Patent is—

1. In a machine for reproducing an image from cinematographic lined films of the Keller-Dorian type, the combination of a source of light, a collimator and an illuminating slot disposed in the focus of said collimator, the said slot being parallelly disposed for the purpose disclosed.

2. In a machine for reproducing an image from cinematographic lined films of the Keller-Dorian type, the combination of a source of light, a collimator and a rectilinear filament disposed in the focus of said collimator, the said rectilinear filament being parallelly disposed for the purpose disclosed.

3. In a machine for reproducing an image from cinematographic films of the goffered type, the combination of a source of light means for projecting parellel light rays from said source of light on to the emulsion side of and thence through the goffered side of said film so as to provide substantially the same angularity on the goffered side of the film for the rays designed to effect a given color and adjustable means for controlling the red, blue and green bands of light emitted whereby the light colors may be modified in the production of the image at will.

4. In a machine for reproducing an image from cinematographic lined films of the Keller-Dorian type, the combination of a source of light, a collimator, an illuminating slot disposed in the focus of said collimator, the said slot being parallelly disposed and adjustable means for controlling the red, blue and green bands of light emitted whereby the light colors may be modified in the production of the image at will.

5. In a machine for reproducing an image from cinematographic lined films of the Keller-Dorian type, the combination of a source of light, a collimator, a rectilinear filament disposed in the focus of said collimator, the said rectilinear filament being parallelly disposed and adjustable means for controlling the red, blue and green bands of light emitted whereby the light colors may be modified in the production of the image at will.

6. In a machine for reproducing an image from cinematographic films of the goffered type, the combination of a source of light means for projecting parallel light rays from said source of light on to the emulsion side of and thence through the goffered side of said film so as to provide substantially the same angularity on the goffered side of the film for the rays designed to effect a given color and an adjustable diaphragm for controlling the red, blue and green bands of light emitted whereby the light colors may be modified in the production of the image at will.

7. In a machine for reproducing an image from cinematographic lined films of the Keller-Dorian type, the combination of a source of light, a collimator, an illuminating slot disposed in the focus of said collimator, the said slot being parallelly disposed and an adjustable diaphragm for controlling the red, blue and green bands of light emitted whereby the light colors may be modified at will.

8. In a machine for reproducing an image from cinematographic lined films of the Keller-Dorian type, the combination of a source of light, a collimator, a rectilinear filament disposed in the focus of said collimator, the said rectilinear filament being parallelly disposed, an adjustable diaphragm for controlling the red, blue and green bands of light emitted whereby the light colors may be modified at will.

9. In a machine for reproducing an image from cinematographic lined films of the Keller-Dorian type, the combination of a source of light having an elongated light transmission means parallel to the line gofferings of the film and a collimator, said means being disposed in the focus of said collimator.

ANDRÉ OSWALD.